United States Patent
Ghiam et al.

[11] Patent Number: 6,040,046
[45] Date of Patent: Mar. 21, 2000

[54] MASKING FILM AND METHOD FOR PRODUCING SAME

[75] Inventors: Farid F. Ghiam; James P. DiPoto, both of Terre Haute, Ind.

[73] Assignee: Tredegar Corporation, Richmond, Va.

[21] Appl. No.: 08/877,073

[22] Filed: Jun. 17, 1997

[51] Int. Cl.$^7$ .................................................... B32B 7/12
[52] U.S. Cl. .................................... 428/343; 428/355 RA
[58] Field of Search .............................. 428/343, 355 RA

[56] References Cited

U.S. PATENT DOCUMENTS

| | | | |
|---|---|---|---|
| 3,725,121 | 4/1973 | Fournier | 117/122 |
| 3,892,900 | 7/1975 | Shima et al. | 428/40 |
| 4,189,420 | 2/1980 | Sugimoto et al. | 260/31.6 |
| 4,447,485 | 5/1984 | Aritake | 428/144 |
| 4,699,842 | 10/1987 | Jorgensen et al. | 428/343 |
| 4,720,416 | 1/1988 | Duncan | 428/195 |
| 4,810,574 | 3/1989 | Anher | 428/355 RA |
| 4,895,760 | 1/1990 | Barger et al. | 428/332 |
| 5,085,908 | 2/1992 | Sano et al. | 428/40 |
| 5,100,709 | 3/1992 | Barger et al. | 428/41 |
| 5,112,674 | 5/1992 | German et al. | 428/216 |
| 5,445,883 | 8/1995 | Kobayashi et al. | 428/335 |
| 5,660,901 | 8/1997 | Wong | 428/35.7 |
| 5,693,405 | 12/1997 | Harvie et al. | 428/156 |
| 5,783,272 | 7/1998 | Wong | 428/35.7 |
| 5,840,430 | 11/1998 | Ramsey et al. | 428/516 |

FOREIGN PATENT DOCUMENTS 53-58578  5/1978  Japan .

*Primary Examiner*—Terrel Morris
*Assistant Examiner*—Arti R. Singh
*Attorney, Agent, or Firm*—Jenkens & Gilchrist, P.C.

[57] ABSTRACT

An improved masking film provides an adequate level of protection to relatively smooth surfaces by providing an adjustable and controlled level of adhesion between the masking film and the surface to be protected without the use of corona treatment or an adhesive under a variety of production and application conditions. The use of varying blends of materials and percentages thereof allows for control of the adhesion level produced between the improved masking film and the substrate surface to be protected. Using the improved masking film of the present invention, the masking film can be customized for a set of production conditions and desire application and will remain removably adhered to the substrate following a heat-loading process such as thermoforming, drape-forming or heat-bending.

20 Claims, 3 Drawing Sheets

Peel Adhesion Values For Substrates

Polycarbonate & Acrylic Substrates Masked at 73F-Function of % Kraton G-1657

MASKING FILM AND METHOD FOR PRODUCING SAME

The present invention relates to masking films and, more specifically, to a masking film which removably adheres to rigid, relatively smooth-surfaced substrates under a variety of conditions without the need for corona treatment or an adhesive, and a method for producing same.

BACKGROUND OF THE INVENTION

Masking films are used in numerous applications as a protective coating or covering for surfaces, particularly smooth surfaces, such as acrylics, glass, polished or painted metals, glazed ceramics, and other smooth, relatively rigid surfaces. The masking film is applied to the surface to be protected and acts as a physical barrier to prevent scratching, scuffing and marring of the surface. Protection provided by masking films is particularly useful while these surfaces are being printed, transported, or otherwise handled prior to use.

Traditionally, protection for smooth surfaces has been provided via corona treated films and/or adhesive coated masking paper. Corona treated films are films exposed to an electrostatic discharge to increase the adhesion level of the film. This is accomplished through the production of surface oxidation of the film via the electrostatic discharge, increasing the attraction between the nonpolar surface of the film and the polar surface of the material to be protected. Such corona treated films are typically non-embossed and rely on a very narrow window of corona treatment to facilitate enhanced adhesion. However, disadvantages exist with this technique. For example, where too little corona treatment occurs, the masking film will not adhere to the surface to be protected. Conversely, where too much corona treatment occurs, it is common to find the masking film laminating to itself and/or laminating completely to the surface to be protected, at best requiring additional time, effort and costs to completely unwind the masking film and/or remove the masking material from the protected surface, and, at worst, ruining the protected material for its intended end use. Additionally, since corona treated masking films have a relatively high surface coefficient of friction, rigid wrinkles commonly form in the masking film. Such wrinkles are difficult, if not impossible, to remove, thus precluding the film from adequately protecting the surface to be protected and/or permanently distorting the surface to be protected, again ruining it for its intended purpose. Finally, corona treated polyethylene films commonly have numerous large gels and carbon specks associated with them which can produce dimples in, or otherwise mar, the surface to be protected.

Disadvantages are also associated with masking films using an adhesive coated paper. For example, where a masking material requiring an adhesive coating is used, moisture from humidity or elsewhere can permeate the masking material and loosen or completely separate the masking material from the surface to be protected. The tendency for moisture to adversely affect the performance of this type of masking film is increased where heat is required to activate the adhesive coating. Additionally, even where the masking material remains firmly adhered to the surface to be protected until its removal is desired, such removal can require the use of a solvent to remove trace amounts of the adhesive coating. The adhesive residue left behind on the surface is of particular concern where the surface being protected is to be used in a context where sanitary conditions are desired, such as in food industry applications. The use of an adhesive coating also requires the additional steps of applying the adhesive coating to the preformed film, as well as the expense of using, activating and storing one or more adhesives to be used as a coating. Finally, where heat-activated adhesive coatings are used, the time and expense of providing the proper amount of heat to the process to facilitate proper adhesion further complicates the process.

Recent advances in masking film technology have produced improved masking films formed without corona treatment or the use of adhesive coatings, including one side smooth, one side matted ("OSM") masking films. Such OSM films are more fully described in U.S. Pat. Nos. 4,895,760 and 5,100,709, both assigned to Tredegar Industries, Inc., Richmond, Va. These advanced masking films rely upon the tendency for smooth surfaces to adhere to each other to produce an adequate and constant level of adhesion without the need for corona treatment and the use of adhesive coatings. Additionally, the matted side of the OSM films prevents blocking and wrinkling of such films by preventing a measure of intimate contact between the surfaces. Importantly, these improved OSM films avoid the numerous problems associated with the use of corona treatment and adhesives and are stable over time, even when exposed to moisture and ultraviolet light.

Despite the advanced nature of the OSM films, however, it was discovered that the level of adhesion produced by these improved masking films can vary with temperature and other conditions associated with the production and use of such improved films. At times, such conditions can result in a masking film exhibiting either too much or not enough adhesion level for the desired application. In other applications, it can result in the need for heaters to raise the temperature of the film so that proper application and adequate adhesion level are achieved. Moreover, since the level of adhesion produced is primarily a function of the interaction between the smooth surface of the masking film and the smooth surface to be protected, the smoothness of the surface requiring protection is a significant factor. This factor can present difficulties, and masking films of this type are of limited utility, where the surface to be protected is not particularly smooth.

Methods for producing such prior art films are relatively rigid and do not offer flexibility in the recipe for such films, thus producing films incapable of producing a variety of adhesion levels under a variety of production conditions for a variety of applications.

Thus there remains a need for a masking film capable of providing an adequate level of protection to merely relatively smooth surfaces by providing a functional, adjustable and controlled level of adhesion between the masking film and the surface to be protected without the use of corona treatment or an adhesive and their associated disadvantages and under a variety of production and application conditions, and a method for producing same.

SUMMARY OF THE INVENTION

In accordance with the present invention there is provided a masking film which adheres to and provides protection for a relatively smooth surface without the need for an adhesive layer or corona treatment. Additionally, the improved film is preferably of the OSM type so that blocking and wrinkling of the film are substantially minimized, if not completely eliminated. Moreover, the adhesion produced is not as dependent upon the smoothness of the surface to be protected. Importantly, the level of adhesion produced by the improved OSM film is adjustable so as to accommodate a variety of production and application conditions. For example, the improved masking film of the present invention will provide a functional level of adhesion to uncoated polycarbonates, acrylics, polyvinyl chlorides and PETG at room or ambient temperature. Accordingly, for virtually any given processing environment, including temperature and line equipment layout, and desired application, the improved masking film of the present invention can provide an adequate level of adhesion to the substrate of interest. The improved masking film of the present invention also remains removably attached to a substrate surface even after the application of post-production heat loading processes, including, but not limited to, thermoforming, drape-forming and heat-bending.

The improved masking film of the present invention comprises a film preferentially having a smooth side, a rough side and, optionally, one or more core layers interposed between the smooth side and the rough side. The monolayer is preferably extruded and the multiple layers are preferably coextruded. The smooth side comprises at least one layer of a thermoplastic film. In use, the smooth side is applied to the relatively smooth surface to be protected. The rough side is also comprised of at least one layer of a thermoplastic film. The rough side is preferably matte embossed, but can be roughened via any suitable means. The rough side prevents the film from contacting as much surface area of itself, or any other surface, preventing blocking and wrinkling of the film. At least one core layer may be interposed between the smooth side and the rough side of the improved masking film and, if present, is also comprised of a thermoplastic film. In the monolayer embodiment, the smooth side and rough side are opposing sides of the single layer of the film.

The level of adhesion produced between the smooth side of the masking film of the present invention and the surface to be protected is adjustable via the introduction of certain polymers and co-polymers associated with the smooth side of the film. The controlled combination of such polymers and co-polymers has the affect of adjusting the level of adhesion produced between the smooth side of the masking film and the surface to be protected by the masking film. The identity and quantities of these polymers are dictated by the conditions (e.g., temperature) under which the masking film will be applied and ultimately used. Thus, for example, the masking film of the present invention can be produced so as to provide a functional and controlled level of adhesion to acrylics at room temperature without subsequent laminating or welding during heat-loading processes, such as thermobending or thermoforming. The level of adhesion can be adjusted to provide adequate levels of adhesion with substrates at a higher temperature.

In other embodiments of the improved masking film of the present invention, a one, two or multilayered masking film is produced including the polymer and copolymer additives capable of adjusting the level of adhesion produced by the film. These films can be blown or cast. Monolayer or coextrusion of multiple layers may be employed. Additionally, in the multilayered embodiment, the layer including the smooth side of the improved masking film of the present invention may be laminated to the layer including the rough side, if desired. The blending of polymer and copolymer additives of the smooth side of the masking film is controlled to produce desired tackiness of the resulting masking film.

According to the method of the present invention, the improved masking film is produced by preselecting the one or more primary components comprising the first skin of the improved masking film of the present invention. It is the surface of this first skin layer which will ultimately intimately contact and adhere with the surface of the substrate to be protected. Once selected, the relative percentages of the one or more components is also predetermined so as to produce a functional and controlled level of adhesion force produced under a given set of the substrate's production conditions and environment.

The remaining skin and core layers, if present, are formed of a thermoplastic. The skin and core layers are preferably coextruded to form the improved masking film of the present invention. Due to the preselection of the components and their relative amounts, the resulting masking film is tailored to perform in the given production environments under the given conditions.

BRIEF DESCRIPTION OF THE FIGURES

A more complete understanding of the present invention may be had by reference to the following detailed description when taken in conjunction with the accompanying figures wherein.

DETAILED DESCRIPTION OF FIGURES

Figure 1:
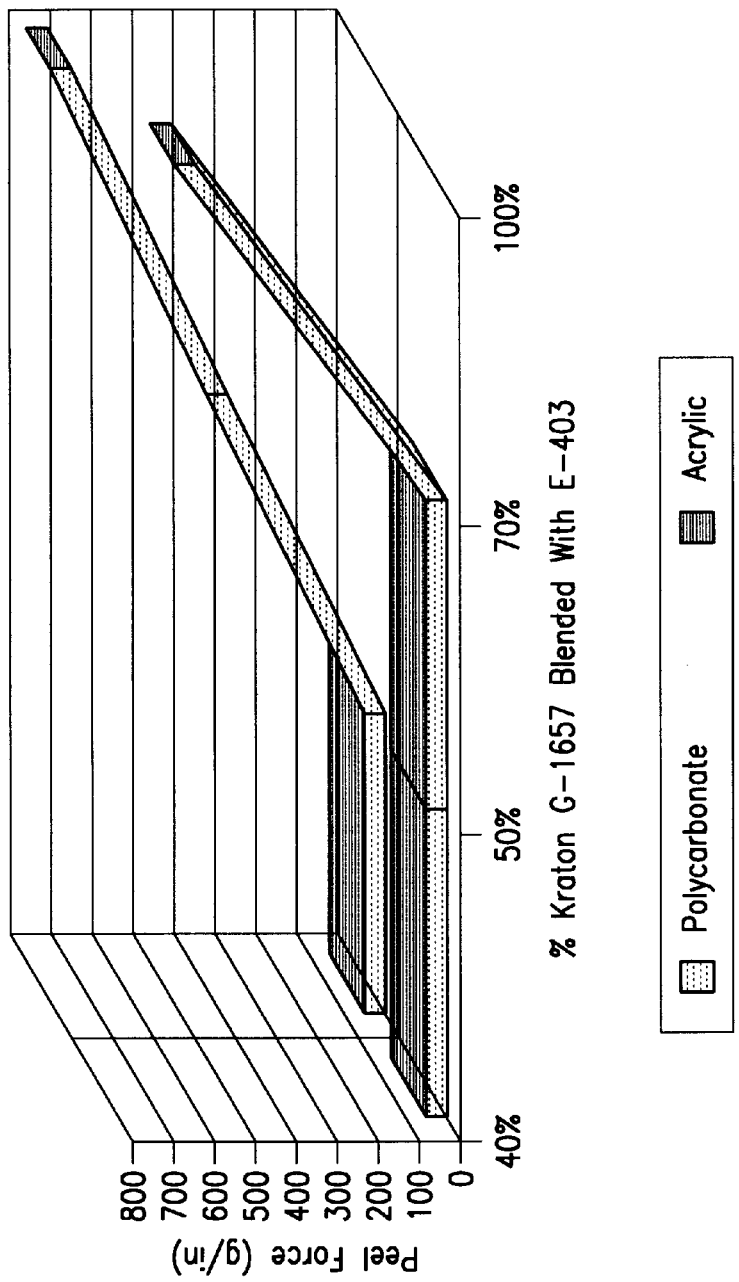
FIG. 1 is a graph depicting peel adhesion values for polycarbonate and acrylic substrates masked at 73° F. and as a function of the percentage of Kraton® G-1657 component of the masking film.

In a preferred embodiment of the improved masking film of the present invention, a first layer having at least one smooth surface and a second layer having at least one rough surface and, optionally, at least one core layer are coextruded to form an improved masking film. Each of the layers is comprised of a thermoplastic film. Preferred films include as at least a primary component blends of Kraton® polymers, including, but not limited to, Kraton-G® and functionalized Kraton-G®, available from Shell Chemical Company. The thermoplastic films making up the layers of the improved masking film of the present invention also may include films of polyolefins (homopolymers and copolymers), polyvinyl alcohol, polyvinyl chloride, nylon, polyester, polystyrene, polymethylpentene, polyoximethylene, and the like, or blends thereof. Acid modified copolymers, anhydride modified copolymers and acid/acrylate modified copolymers are also useful. Films of polyethylene are particularly suited and therefore preferred and films of low density polyethylene homopolymers are even more particularly suited and therefore more preferred due to their relatively low flexure modulus which tends to conform better to surfaces.

The rough side of the second layer is preferably embossed to produce the desired roughness. The roughness of the second layer is important to prevent blocking and wrinkling of the masking film. The rough surface prevents blocking by precluding such intimate contact between the surfaces of the masking film and another surface such that the masking film can be easily unrolled and/or peeled away from another smooth surface. This feature also prevents the wrinkling so often associated with traditional masking films.

In a preferred embodiment, the first layer includes a surface having a measure of smoothness of from about between 0 Ra and 60 Ra, and more preferably, between 0 Ra and 30 Ra. In a preferred embodiment, the relatively rough surface of the second layer includes a measure of roughness of from between 65 Ra and 600 Ra, and more preferably, between 100 Ra and 300 Ra. For purposes of this application, smoothness and roughness will be defined as the arithmetic average height of the micropeaks and microvalleys of a surface to the center line of such surface as measured by a profilometer. Smoothness and roughness defined in this manner is typically expressed with units of microinches ($10^{-6}$ inches) (Ra). All testing of surface textures (relative smoothness and roughness) were conducted in accordance with ANSI/ASME Test Method B46.1-1985, the entire content of which is incorporated herein by reference. Although measures of smoothness of from about between 0 Ra and 60 Ra are preferred and measures of roughness from about between 65 Ra and 600 Ra are preferred, it is noted that the improved masking film may have virtually any level of relative smoothness or roughness and still prevent much of the blocking and wrinkling associated with traditional masking films. Matte embossing is a preferred technique for imparting a sufficient level of roughness to the second layer. Although matte embossing has been described as a preferred technique by which the second layer is provided with roughness, it should be noted that the roughing of the surface of the second layer may be accomplished via any suitable method or means, if desired.

It is noted that although the preferred embodiment includes at least a first layer and a second layer, the relatively smooth side and the relatively rough side of the improved masking film of the present invention can be formed on opposite sides of a single layer of thermoplastic material, if desired. In such an embodiment, no core layers would be present.

Returning now to the preferred embodiment, fillers added to the second layer will provide certain desired characteristics, including, for illustrative purposes only, roughness, abrasion resistance, printability, writeability, opacity and color. Such fillers are well known in the industry and include, for illustrative purposes only, calcium carbonate (abrasion resistance), mica (printability), titanium dioxide (color and opacity) and silicon dioxide (roughness).

The degree of relative smoothness/roughness desired can be imparted via any suitable means known in the art, including, without limitation, air impingement, air jets, water jets, and combinations thereof.

In a preferred embodiment, the multiple layers of the improved masking film of the present invention are coextruded using any coextrusion process known in the art. The use of coextrusion allows for the relatively simple and easy manufacture of a multilayered masking film composed of distinct layers, each performing specific functions. Although coextrusion of the improved multilayered masking film of the present invention is preferred, it is again noted that the improved masking film can be monolayered or multilayered and that, regardless of form, the improved masking film can be produced using any other suitable method, if desired.

In use, the relatively smooth surface of the first layer of the improved masking film of the present invention is brought into intimate contact with a relatively smooth surface to be protected. While not wishing to be bound by the following theory, the Applicants believe that the smooth surface of the masking film adheres to the smooth surface of the substrate to be protected through intimate contact via the natural blocking adhesion which exists between a very smooth surface and another smooth surface via polar bonding, ionic bonding and, in some instances, hydrogen bonding, and/or Van der Waals secondary bonding. Preferred substrates for such surfaces include, by way of illustration only, polycarbonates, acrylics, polyvinyl chlorides, PET, PETG, glass, ceramics and metals.

While the foregoing theory also applies to prior art OSM type films, it has been discovered that the relative smoothness/roughness of the smooth side of the improved film of the present invention plays a less important role in the production of adhesion, thus allowing the improved masking film of the present invention to be used under a wider variety of conditions (e.g., temperature at the time the masking film is applied). Generally, it has been discovered that the relative smoothness of the smooth side of film will be of greater importance where application temperatures during the masking process are lower. Conversely, the higher the application temperature, the less important a role the relative smoothness plays.

Any one or more of a number of conventional application methods can be used to bring the smooth side of the first layer of the improved masking film into intimate contact with the smooth surface of the substrate to be protected by the masking film. Typically, the improved masking film will be applied to the surface to be protected via a nip roll or similar system through which the multilayered film and the substrate surface to be protected are passed simultaneously. If desired, the resulting article can be passed through compression rolls or the like for further processing. Any other suitable method for combining the multilayer film with the substrate surface to be protected can be used, if desired.

Turning now to the level of adhesion produced between the smooth side of the first layer of the improved masking film of the present invention and the substrate surface to be protected, a significant improvement in OSM masking films has been achieved with the improved masking film of the present invention due to its ability to have the adhesion level adjusted according to specific production and application conditions. Adjustment of the adhesion level allows the improved masking film of the present invention to be used for certain substrates at room temperature. Traditional OSM masking films typically require heat to produce the desired level of adhesion. For example, in some applications, latent heat within the substrate's surface to be protected creates a desired adhesion level. However, this will vary from machine to machine in a single process, and even more widely between processes, thus making the use of OSM masking films more difficult and expensive since adjustments in procedure and/or equipment are needed to consistently achieve a desired level of adhesion. Additionally, in some instances where post-production heat-loading processes, including, but not limited to, thermoforming, drape-forming and heat-bending are employed with prior art masking films, the masking film is destroyed upon subsequent attempts to remove the film. Destruction of the masking film occurs in these attempts at removal since the heat-loading has increased the adhesion force between the substrate surface and the masking film to a point where the peel strength needed to remove the masking film exceeds the tensile strength of the masking film itself thus causing the film to tear or break before it will peel away from the substrate.

Adjustment of the adhesion level produced in the present invention is accomplished through the introduction of certain polymers and copolymers into the smooth side of the thermoplastic film independent of varied levels of, or even the complete absence of latent or added heat. The preferred primary polymer associated with the smooth side of the first layer to affect the adhesion level produced is a styrene-ethylene-butylene-styrene block copolymer, a styrene-ethylene-propylene block copolymer, or blends thereof, such as Kraton®-G polymers available from Shell Chemical Company. Secondary polymers such as polyolefins (homopolymers or copolymers), styrenes, butylenes, polymethylpentene and polyoximethylene, and mixtures thereof, are blended at varying ratios with the primary polymer (e.g., SEBS) to provide the desired level of adhesion of the film. For example, where room temperature adhesion to PC and acrylics is desired, a styrene-ethylene-butylene-styrene block copolymer is either used alone or is blended with a second component. Once extruded, the smooth side of the first layer will provide an adequate and controlled level of adhesion to PC and acrylics at room temperature, eliminating the need to heat the materials to achieve desired adhesion. As previously discussed, depending upon the desired application, the polymer and copolymer blends may be modified for improved performance. Although a primary component and a secondary component are described herein, it is noted that embodiments of the present invention masking film including only a primary component exist and are useful as described herein.

Figure 2:
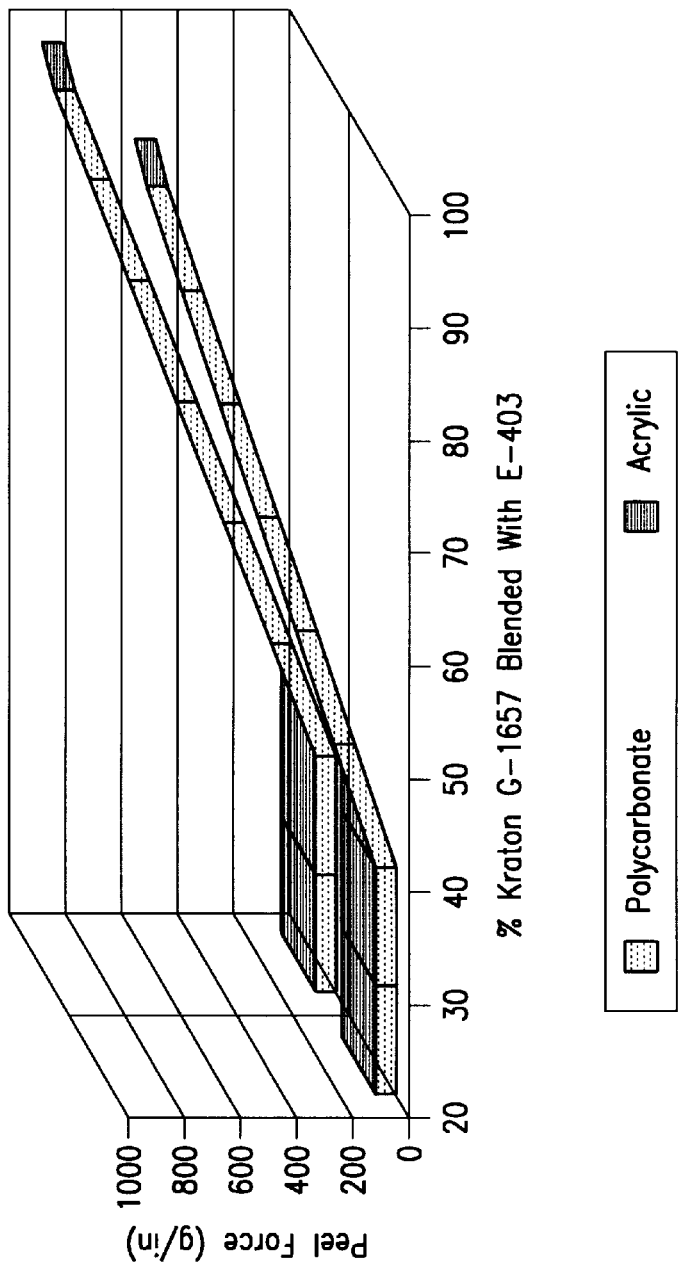
FIG. 2 is a graph depicting peel adhesion values for polycarbonate and acrylic substrates masked at 120° F. and as a function of the percentage of Kraton® G-1657 component of the masking film.
Figure 3:
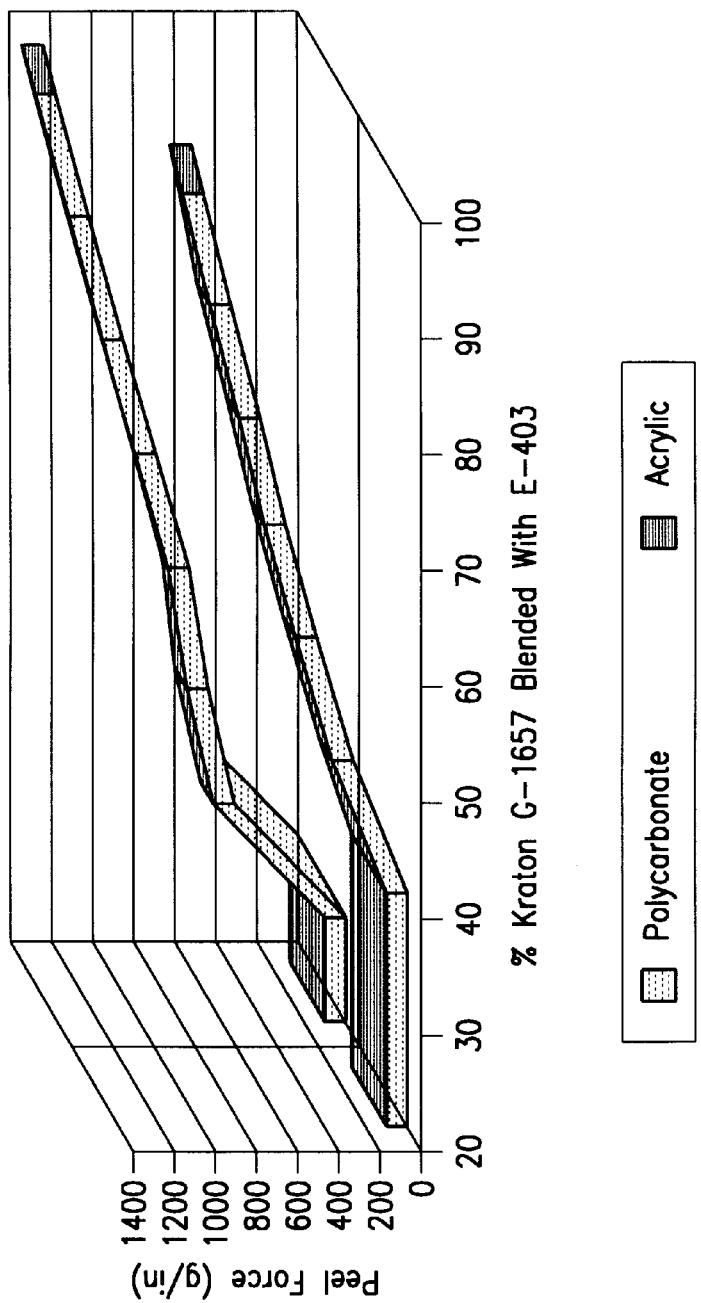
FIG. 3 is a graph depicting peel adhesion values for polycarbonate and acrylic substrates masked at 200° F. and as a function of the percentage of Kraton® G-1657 component of the masking film.

A further understanding of the improved masking film of the present invention can be obtained by reference to FIGS. 1–3. FIGS. 1–3 depict graphs illustrating the peel adhesion values measured on acrylic and polycarbonate substrates using a masking film including a blend of E-403/Kraton® G-1657 as a function of the percentage Kraton® G-1657 present and at 73° F., 120° F. and 200° F., respectively. The test data were produced and gathered according to the following test procedures.

TEST PROCEDURES

The smooth side of a coextruded film was made by blending various percentages of two polymers: Bynel E-403 resin, an acid-modified ethylene acrylate available from DuPont, and Kraton® G-1657, a styrene-ethylene butylene-styrene copolymer, available from Shell Chemical Company. The resulting film was then masked to a sheet of ⅛" acrylic or polycarbonate by contacting the sheet with the masking film at room temperature and nip rolling the masked sheet to remove any air. The resulting masked sheet was either tested for peel force at room temperature or placed in an oven for a given time period at a given temperature. The masked sheet was then removed from the oven and nip rolled again. A one inch strip of the masking film was used in a 180° peel test. The peel test was conducted according to a modified version of ASTM Standard D3330-90. An Instron tensile testing machine was used to measure the force required to peel 4–6 inches of a one inch-wide strip of masking film from the acrylic sheet.

As outlined above, the results of the above-identified tests are summarized in the Graphs set forth in FIGS. 1–3.

All of the samples tested above were further tested for performance subsequent to undergoing a heat-loading process, such as thermoforming, drape-forming and heat-bending. In the heat-bending procedure, the sample sheet was heated to its softening point using a conventional "strip heater". The softening point was visually inspected by recording the temperature at which the sheet bent over the strip heater to a predetermined angle. The temperature of such bending was at or above 100° C. for acrylic and 150° C. for polycarbonate. Once the sheet was bent to the predetermined angle, the sheet was allowed to cool to maintain the desired angle. For thermoforming, the sheet samples were heated to their glass transition temperature and then forced via vacuum into a desired shape using a vacuum mold.

All of the samples performed well under these heat-loading tests in that the improved masking sheets of the present invention were peeled from the surface after treatment without destruction of the masking film.

The results of the above-identified tests are summarized in Tables I and II below.

TABLE I

Polycarbonate
Peel Strength - 3 Hours After Masking

| Application Temp. ° F. | Adhesion Values - Prior Art (g/in) | Adhesion Values - Present Invention (g/in) |
| --- | --- | --- |
| 73 | 0–25 | 15–750 |
| 120 | 10–70 | 21–890 |
| 200 | 30 to Destruct | 64–1360 |
| After Heat-Loading Process (e.g., Thermoforming) | Destructs | Peels |

TABLE II

Acrylic
Peel Strength - 3 Hours After Masking

| Application Temp. ° F. | Adhesion Values - Prior Art (g/in) | Adhesion Values - Present Invention (g/in) |
| --- | --- | --- |
| 73 | 0–20 | 14–539 |
| 120 | 5–40 | 20–658 |
| 200 | 20 to Destruct | 53–778 |
| After Heat-Loading Process (e.g., Thermoforming) | Destructs | Peels |

As evidenced by the foregoing, by varying the blend components and the percentages thereof comprising the improved masking film of the present invention, the level of adhesion produced between the improved masking film of the present invention and the substrate surface to be protected, as expressed by the peel force numbers in the tables, is also adjusted. Thus, using the improved masking film of the present invention, it is possible to: (a) produce a desired level of adhesion by selecting the appropriate blend of materials and percentages thereof, and (b) use the improved masking film of the present invention on substrates subject to post-production heat-loading processes (e.g., thermoforming, drape-forming and heat-bending) without destruction of the film upon subsequent removal thereof.

Importantly, the desired level of adhesion is achieved despite the processing environment and application constraints under which such masking film is used. For example, if the desired application and application context is to adhere the masking film to polycarbonate at room temperature the appropriate combination of materials can be selected and produced using the improved masking film of the present invention. Even where the masking film is to protect a relatively rough surface, the blend and temperature can be altered to produce the appropriate level of adhesion. With prior art masking films, the processing environment (e.g., equipment placement) and/or desired application temperature were often altered in an effort to obtain the desired adhesion level from the masking film.

The improved masking film of the present invention is thus capable of providing a controlled, adjustable and adequate level of protection to smooth surfaces of substrates by providing a controlled level of adhesion between the masking film and the surface to be protected without the use of corona treatment or an adhesive and their associated disadvantages and under a variety of production and application conditions. The unique advantages of the improved masking film of the present invention allow the film to be modified to meet the desired application and processing environment.

According to the method of the present invention, the above-identified improved masking film is produced employing the steps of preselecting one or more primary polymers of the at least one first skin layer of the film, preferably including a styrene-ethylene-butylene-styrene block copolymer, a styrene-ethylene-propylene block copolymer, or blends thereof, and, more preferably, including a Kraton®-G copolymer; preselecting one or more additional elements of the at least one first skin layer of the film, predetermining the relative percentages of each constituent element selected; coextruding the at least one first layer with the at least one second layer and the at least one core layer to form a multilayered masking film. The resulting masking film is tailored made to perform (i.e., produce a desired level of adhesion) under a given set of production conditions and environment.

Although preferred embodiments of the invention have been described in the Graphs, Tables and foregoing Detailed Description, it will be understood that the invention is not limited to the embodiments disclosed, but is capable of numerous rearrangements and modifications of parts and elements without departing from the spirit of the invention.

What is claimed is:

1. A masking film, comprising:
   a first side having a smooth surface;
   a second side having a rough surface;
   said smooth surface of the first side capable of removably adhering to a relatively smooth surface of a substrate due to intimate contact therewith;
   said first side further comprising one or more components preselected to affect the amount of adhesion produced between the smooth surface of the first side and the relatively smooth surface of the substrate at a given temperature; and
   wherein the two or more components preselected to affect the amount of adhesion produced between the smooth surface of the first side and the relatively smooth surface of the substrate at a given temperature include at least one primary component and at least one secondary component.

2. The masking film of claim 1, wherein the at least one primary component is a styrene-ethylene-butylene-styrene block copolymer, a styrene-ethylene-propylene block copolymer, or blends thereof.

3. The masking film of claim 2, wherein the at least one primary component is a styrene-ethylene-butylene-styrene block copolymer.

4. The masking film of claim 1, wherein the at least one secondary component is selected from the group consisting of styrene-ethylene-butylene-styrene block copolymers, styrene-ethylene-propylene block copolymers, polyolefins (homopolymers or copolymers), styrenes, butylenes, polyvinyl alcohols, nylons, polyesters, polyvinyl chlorides, polymethylpentene and polyoximethylene.

5. The masking film of claim 4, wherein the polyolefins are acid modified, anhydride modified or acrylate modified.

6. The masking film of claim 1, wherein the masking film comprises at least two layers.

7. The masking film of claim 6, wherein the smooth surface is associated with a first layer and the rough surface is associated with a second layer of the masking film.

8. The masking film of claim 6, wherein the multiple layers of the masking film are coextruded.

9. The masking film of claim 7, wherein the rough surface comprises one or more of the following: polyolefins (homopolymer or copolymer), styrene, butylene, polyvinyl alcohol, nylon, polyester, polyvinyl chloride, polymethylpentene or polyoximethylene.

10. The masking film of claim 1, further including additives to improve abrasion resistance, printability, writeability, opacity, cuttability, color or roughness.

11. The masking film of claim 1, wherein the first side removably adheres to the substrate at room temperature.

12. The masking film of claim 1, wherein the substrate to be protected is selected from the group consisting of polycarbonate, acrylic, PETG, PVC, PET, glass or metals.

13. The masking film of claim 1, wherein the first side remains removably adhered to a substrate following subjecting the substrate including the masking film to a heat-loading process.

14. The masking film of claim 13, wherein the heat-loading process includes thermoforming, drape-forming or heat-bending.

15. The masking film of claim 1, wherein the rough surface of the masking film is matte embossed.

16. A masking film, comprising:
    a first side having a smooth surface;
    a second side having a rough surface;
    said smooth surface of the first side capable of removably adhering to a relatively smooth surface of a substrate due to intimate contact therewith;
    said first side further comprising at least one primary component and at least one secondary component preselected to affect the amount of adhesion produced between the smooth surface of the first side and the relatively smooth surface of the substrate at a given temperature;
    wherein the at least one primary component is a styrene-ethylene-butylene-styrene block copolymer, a styrene-ethylene-propylene block copolymer, or blends thereof; and
    wherein the at least one secondary component is selected from the group consisting of polyolefins (homopolymer or copolymer), styrenes, butylenes, polyvinyl alcohols, nylons, polyesters, polyvinyl chlorides, polymethylpentene, polyoximethylene, and blends thereof.

17. The masking film of claim 16, wherein the masking film comprises at least two layers.

18. The masking film of claim 16, wherein the first side removably adheres to the substrate at room temperature.

19. The masking film of claim 16, wherein the first side remains removably adhered to the substrate following subjecting the substrate including the masking film to a heat-loading process.

20. The masking film of claim 19, wherein the heat-loading process includes thermoforming, drape-forming or heat-bending.

* * * * *

UNITED STATES PATENT AND TRADEMARK OFFICE
CERTIFICATE OF CORRECTION

PATENT NO.   : 6,040,046
DATED        : March 21, 2000
INVENTOR(S)  : Ghiam et al.

It is certified that error appears in the above-identified patent and that said Letters Patent is hereby corrected as shown below:

Column 9, line 42    Replace "one" with --two--.

Signed and Sealed this

Fifth Day of June, 2001

Attest:

Attesting Officer

NICHOLAS P. GODICI
Acting Director of the United States Patent and Trademark Office